(No Model.) 2 Sheets—Sheet 1.

J. MONZEL.
SPRING COILING MACHINE.

No. 499,794. Patented June 20, 1893.

Witnesses
Charles E. Tetley.
H. S. Gilman.

Inventor
John Monzel
By his Attorney
Francis M. Ireland

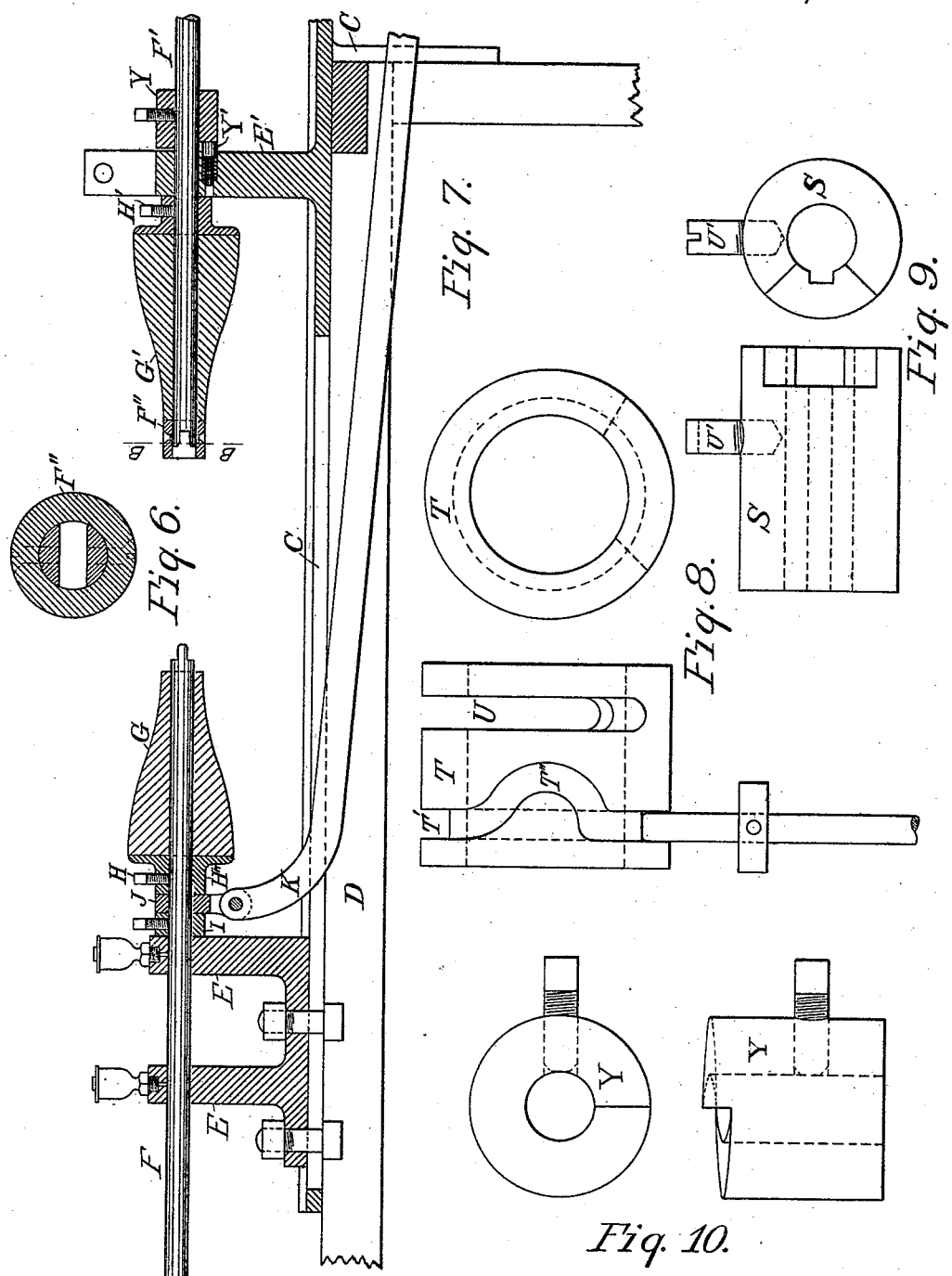

UNITED STATES PATENT OFFICE.

JOHN MONZEL, OF CHICAGO, ILLINOIS.

SPRING-COILING MACHINE.

SPECIFICATION forming part of Letters Patent No. 499,794, dated June 20, 1893.

Application filed December 5, 1892. Serial No. 454,146. (No model.)

*To all whom it may concern:*

Be it known that I, JOHN MONZEL, a citizen of the United States, residing at Chicago, in the county of Cook and State of Illinois, have invented a new and useful Improvement in Spring-Coiling Machines, of which the following is a specification.

My invention relates to spring-coiling machines, and my object has been to provide a simple machine wherein the clutch for connecting the power with the spindle which carries the forming blocks, and the mechanism for cutting off and throwing off the coiled spring, may all be controlled and operated by the foot of the operator.

My invention is illustrated in the accompanying drawings wherein—

Figure 1:
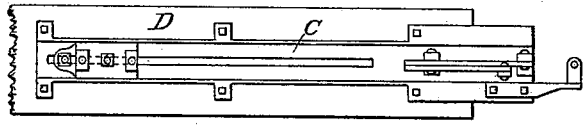
Figure 2:
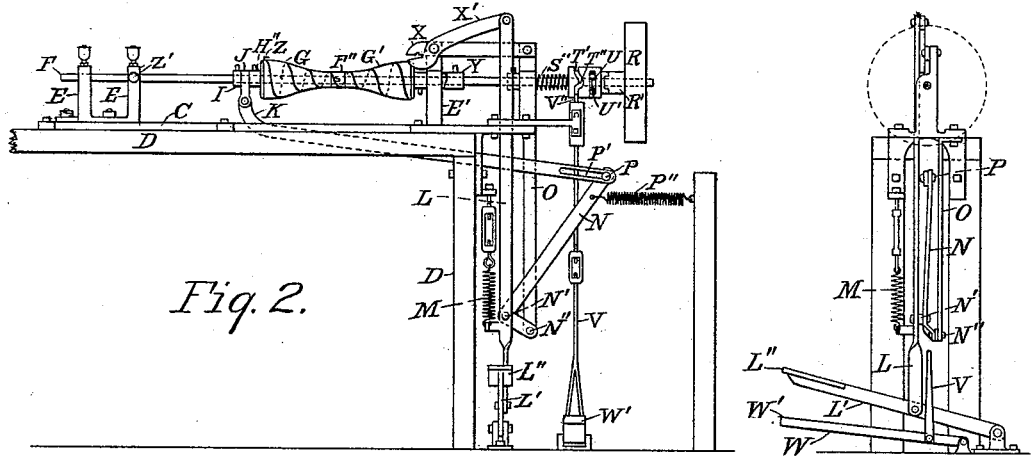
Figure 3:
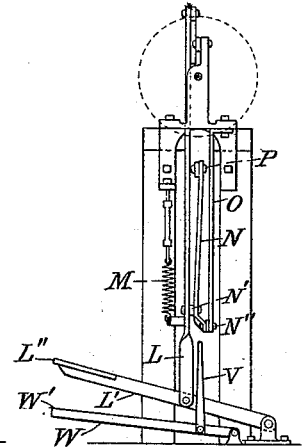
Figure 4:
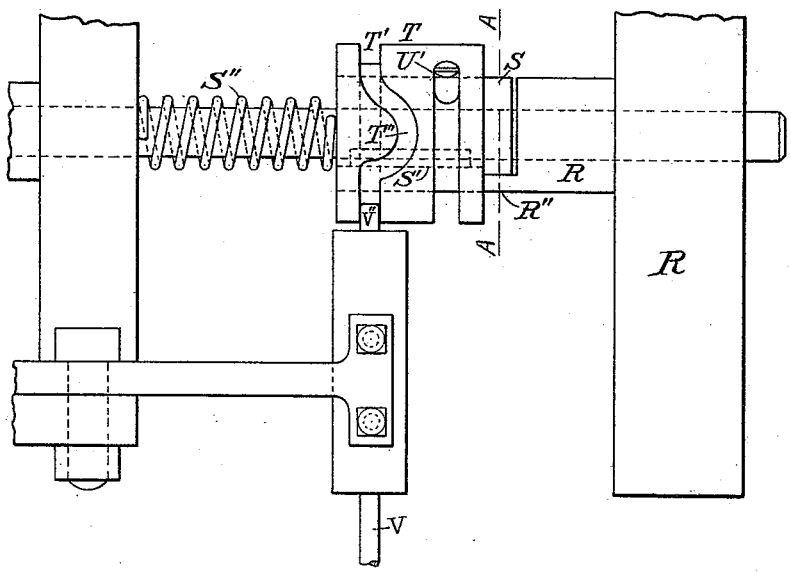
Figure 5:
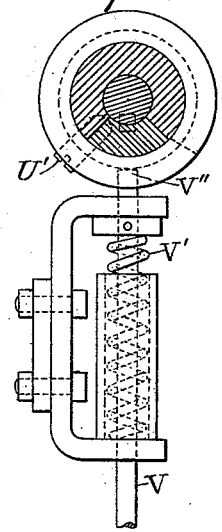

Figure 1 is a top view of the frame of the machine. Fig. 2 is a side elevation of a complete machine embodying my improvements. Fig. 3 is an end view of the same with the driving mechanism removed. Fig. 4 is an enlarged view of the clutch for connecting the spindle with the power wheel. Fig. 5 is a part sectional view on line A—A of Fig. 4. Fig. 6 is a horizontal section on line B—B of Fig. 7. Fig. 7 is a longitudinal vertical section through the forming blocks and their supporting frame, parts being in perspective. Fig. 8 shows details of the outer sleeve of the clutch. Fig. 9 shows details of the inner sleeve of the clutch, and Fig. 10 shows details of a sleeve for stopping the spindle against backward motion.

Like parts are indicated by the same letter throughout the several views.

D is a bench or table upon which the machine is mounted.

The frame of the machine consists of the bed-plate C and the arms E, E and E' bolted or otherwise firmly secured to the bed-plate.

F is a spindle supported by bearings in the arms E E.

F' is a spindle which turns in a bearing in the arm E'.

G and G' are conical grooved forming-blocks mounted upon the spindles F and F' respectively, and secured to such spindles so as to rotate therewith by the screws H and H' passing through collars of such forming blocks. The spindles F and F' have their opposed ends formed the one with a flattened tongue and the other with a groove into which the tongue fits to form a driving connection when brought together. The collar F'' is screwed firmly upon one end, as F', and projects so as to cover the joint and strengthen it.

I is a collar upon the spindle F.

Between the collars I and H'' is the sleeve J mounted loosely upon the spindle and attached to the bar K.

L is a vertical bar the lower end of which is attached to the lever L' having treadle L''. The spring M retains the bar L in the position shown in Fig. 2 when no pressure is applied to the treadle.

N is an elbow-lever pivotally attached to the bar L by the screw or bolt N', and pivoted at N'' to the bar O rigidly attached to the frame of the machine.

P is a pin in the end of the elbow-lever which connects it with the bar K by entering a slot P' in the end of such bar. The spring P'' holds the lever N in the position shown in Fig. 2 when no pressure is applied to the treadle L''.

Passing now to the mechanism for connecting the power with the spindle and disconnecting the same at the will of the operator. R is a pulley mounted loosely upon the spindle F' and turning continuously in the direction indicated by the arrow. Upon the extended hub R' of this wheel is a projection R'' which is adapted to engage a recess in the inner sleeve S of the clutch. This sleeve S is loose upon the spindle so as to slide longitudinally thereon, but has a driving connection therewith by means of a feather S'. S'' is a spring whose office is to force the sleeve S against the hub R'. T is a sleeve outside the sleeve S. U is a slot in this outer sleeve through which passes the pin U' projecting from the inner sleeve S. The slot U may be short as seen in Fig. 2, but is preferably made to extend more than half way around the sleeve as in Figs. 4 and 8. T' is a groove in the outer surface of the sleeve T curved at T'' so as to form a cam. V is a vertical bar forced upward by the spring V'. The end V'' of this bar, when the spring is permitted to perform its office, projects into the groove. The bar V is attached at its lower end to the lever W having treadle W'.

The clutch consists, as is seen, of two elements: an inner sleeve which has a driving connection with the shaft, and an outer sleeve which is operated by the cam to slide the clutch upon the spindle, the two elements being connected loosely by pin and slot. This device I term a compound clutch consisting of a driving element and an operating element and a loose connection between the two. It will be understood that so far as the office of connecting shaft and pulley is concerned, this might be accomplished if the outer sleeve were eliminated and the cam placed upon the inner sleeve. The object of the arrangement I have adopted is to permit of a backward motion of the shaft through a portion of a revolution without changing the position of the cam, for the purpose hereinafter set forth. Of course many changes could be made in this device without departing from the essential idea of my invention, as, for example, it is immaterial which sleeve has the pin and which the slot, and equally immaterial which sleeve meshes with the power wheel. The essence of the device is the separating of the clutch into two elements by one of which it drives the shaft and by the other is itself operated, and the establishing of a play between these elements.

The wire cutter consists of the stationary cutting bar X, and the movable cutting bar X' pivoted to the upper end of the rod L, by which it is operated. Y is a collar secured upon the spindle F' by a set screw. The end of this collar next the arm E' is spiral faced, and the spring-supported pin Y' bears against such spiral face. The object of this device is to act as a stop against backward motion of the spindle.

The operation of the machine is as follows: When the machine is ready to begin operation the parts will be in the position shown in Fig. 2, except that the pin V'' will be in that portion of the groove marked T''' and the clutch will thus be held out of engagement with the revolving pulley. The end of the wire to be coiled into a spring is inserted under the hook Z upon the former. The treadle W' is then pressed downward by the foot of the operator. This pulls downward the rod V and withdraws the pin V''' from the cam-groove. The clutch, thus freed, is pushed by the spring S'' against the hub R' of the power wheel, the projection R'' engages with the recess of the sleeve S, and the clutch is turned carrying with it the spindle. The wire guided by the hand of the operator is coiled upon the former in the grooves thereof until the spring is formed. The operator then removes his foot from the treadle W', and the spring V' secured to an arm of the frame of the machine, as shown, and bearing against a lug upon the rod V'' forces the rod V upward until its end enters the groove and by means of the cam withdraws the clutch from engagement with the pulley into the initial position. The operator now places his foot upon the treadle L'' to cut the wire and throw off the spring. It is desirable that the wire be first cut before the forming blocks are separated, and this I accomplish through the slotted connection between the elbow-lever N and the rod K. As the rod L is pulled downward, the cutting bar pivoted to the end thereof is at once moved to cut the wire; but the pin P slides in the slot P' and does not move the bar K until the end of the slot is reached. Thereupon, the wire having been cut, the bar K is moved, the sleeve J pressing against the collar I separates spindle F and forming block G from spindle F' and forming block G', as seen in Fig. 7, and permits the coiled spring to drop out. Upon removing the foot from the treadle L'', the springs M and P''' return the parts to their initial position, and the machine is ready to repeat the operation. If the wire be cut as soon as the spring is formed and while wire, former, and spindle are in the position to which they have been carried by the power wheel, it is evident that the end of the spring would be straight, not having had the curve set in it by the former. It is therefore desirable that the former be turned backward through a portion of a revolution before the wire is cut. The slot U in the outer sleeve of the clutch permits a reverse motion of the spindle and inner sleeve through a partial revolution without moving the outer sleeve or disturbing the position of the finger in the cam-groove. The pull of the operator upon the wire imparts the necessary power. To prevent this reverse motion being carried too far, the stop-collar Y and pin y' are provided, which by means of a set screw can be set to stop the motion at any desired position. The forming-blocks, being secured to their spindles by set-screw and collar, as shown, are easily removed and replaced by others of a different size when desired; it being only necessary to loosen the screws and slide the blocks off the ends of their spindles. If it be desired to wind but a single helical spring, the bolt N' is removed, the outer forming - block and spindle are moved outward and secured by the set screw Z'. The forming block G will then remain in the position shown in Fig. 7, and the only office of the bar L will be to operate the cutter.

What I claim as new, and desire to secure by Letters Patent, is—

1. In a spring-coiling machine, conical forming-blocks each provided with a collar and set-screw, by means of which they are rigidly secured to the spindles with which they rotate, substantially as shown and described.

2. In a spring-coiling machine, the combination of the rod L, a wire cutter connected with and operated by such rod, and mechanism for forcing the forming blocks apart also connected with and operated by such rod, substantially as shown and described.

3. In a spring-coiling machine, the combination of a rod L, a wire-cutter connected therewith and operated thereby, a lever connected with and operated by said rod and having a slotted connection with the arm which reciprocates the outer forming block, so that one motion of the rod L first cuts the wire and then separates the forming blocks.

4. In a spring-coiling machine, a stop to prevent backward motion of the block-carrying spindle, consisting of a collar with a spiral-faced end upon said spindle, and a spring-supported stop-pin, substantially as shown and described.

5. In a spring-coiling machine an adjustable stop to prevent backward motion of the block-carrying spindle, consisting of a collar with a spiral faced end secured upon such spindle by a set-screw, and a spring-supported stop-pin, substantially as shown and described.

6. In a spring coiling machine the combination of a spindle carrying the forming block, a power-wheel, and a clutch for connecting wheel and spindle, said clutch consisting of a sleeve mounted upon the spindle and having a driving connection therewith, a second sleeve mounted loosely upon the first and provided with a cam for throwing the clutch into or out of engagement with the driving wheel, and a loose connection between such sleeves, substantially as shown and described.

7. In a spring-coiling machine the combination of a spindle carrying the forming-block, a power wheel, and a clutch for connecting wheel and spindle, said clutch consisting of a sleeve mounted upon the spindle and having a driving connection therewith, a second sleeve mounted loosely upon the first and operated to throw the clutch into or out of engagement with the driving wheel, and a loose connection between such sleeves, as and for the purpose specified.

8. In a spring-coiling machine the combination of a spindle carrying the forming-block, a power-wheel, and a clutch for connecting wheel and spindle, said clutch consisting of two sleeves, one sliding upon a feather upon the shaft, the other mounted loosely upon the first and provided with a cam for throwing the clutch into or out of engagement with the driving wheel, said sleeves connected loosely by means of a pin from one passing through a slot in the other, substantially as shown and specified.

9. In a spring-coiling machine, the combination of a spindle carrying the forming block, a power wheel, a clutch consisting of a driving element, an operating element and a loose connection between them, so as to permit of backward movement of the spindle, and a stop upon the spindle as and for the purpose specified.

JOHN MONZEL.

Witnesses:
H. S. GILMAN,
FRED CARREL.